Patented Oct. 18, 1938

2,133,689

UNITED STATES PATENT OFFICE 2,133,689

UREA ALDEHYDE MOLDING COMPOSITIONS CONTAINING A LATENT CURING CATALYST

Carleton Ellis, Montclair, N. J., assignor, by mesne assignments, to Plaskon Company Incorporated, New York, N. Y., a corporation of Delaware No Drawing. Application April 30, 1937, Serial No. 139,948

9 Claims. (Cl. 106—22)

This invention relates to urea-aldehyde molding compositions containing a curing catalyst of the latent type, and to the process of making and using the same.

By a latent catalyst I mean a substance of such type as defined in my U. S. Patent 1,905,999, that is, one which is active only when a given temperature is reached. Such a curing agent should preferably release an acid only at a temperature near that at which hot pressing is ordinarily carried out, namely in the neighborhood of 150° C. A latent catalyst is important in that it allows a composition to be prepared which may be stored for long periods before use and when the composition is placed in a hot die and subjected to pressure, the "cure" of the composition, i. e. polymerization and condensation thereof, is facilitated by the acid released by said catalyst. Other prerequisites of such a catalyst are: (1) it should be stable over a long period of time and at temperatures below the temperature of hot pressing; (2) it should be substantially neutral before being broken down by the heat and pressure of molding; (3) it should be colorless, and yield colorless products on decomposing; and (4) it should not give off an acid so strong or so reactive that it might react with the steel of the die and thus bring about corrosion. It is the purpose and object of the prevent invention to provide molding compositions with a compound of this character which will operate to materially facilitate the hot pressing of urea-aldehyde compositions in the formation of light-colored shaped articles of ample water, shock and heat resistance.

I have discovered that the prerequisites of a latent catalyst are possessed by the salts of the mono- and di-halogenated aliphatic carboxylic acids and by the salts of halogenated acetic acid and alpha and alpha-beta halogenated homologues of acetic acid in particular. Rather peculiarly the curing property possessed by the mono- and di-halogen compounds is not evinced by the tri-halogen compounds. As specific examples of such compounds may be mentioned salts such as chloracetates, bromacetates, iodoacetates, fluoracetates, dichloracetates, α-chlorpropionates, α,β-dichlorpropionates, α,β-dibrompropionates, α,β-dichlorstearates and the like. The salts may be of any base metal but among those preferred may be mentioned sodium, potassium, ammonium, aluminum, zinc, calcium, magnesium, and so forth. Such metals as lead and mercury are applicable but are not desirable because of the possibility of toxic substances being introduced.

According to H. M. Dawson and M. B. Dyson (J. C. S., 1933, 49 and 1133) and other investigators, such salts decompose to give the metallic halogenate and the corresponding hydroxy carboxylic acid. It is probable that the curing action of such substances is due to the free acid liberated, but partial hydrolysis of the metallic salt by-product of the reaction may aid the catalysis. In the case of di-halogenated acids, the reaction may take a different course. The above theory is offered as an explanation only, and I do not wish to be limited thereby. I have determined, however, that if crystalline sodium monochloracetate is heated to a temperature such as used in molding, an acid is liberated which gives a positive test with wet litmus paper but gives a negative test with silver nitrate, thus proving that an acid is liberated which is not hydrogen chloride.

In making a urea resin molding composition, I may react 1 mole of urea or equivalent substance with 1 to 2 moles, preferably 1.5 moles, of formaldehyde or equivalent substance under alkaline, neutral, or acid conditions, and obtain thereby a hydrophilic, or even water-soluble, condensation product. This may be incorporated with a cellulosic material such as, for example, paper pulp, alpha cellulose, wood flour, and the like. In so doing, the urea-formaldehyde resin reacts with the cellulose to produce what is known as a glucanure compound. It is necessary to remove from the mixture the solvent, usually water, in which the urea-formaldehyde condensation was accomplished. This can be done by drying, either at atmospheric or reduced pressure, at a temperature desirably below 100° C. The dried material is usually finely ground and screened. It is customary to include a curing catalyst and a lubricant, such as zinc stearate, at some point in the process.

A convenient way to incorporate the catalyst is simply to dissolve the salt in the resin syrup before the latter is mixed with the filler. Wetting agents such as ethyl alcohol or acetone may be added if desired. Another way is to thoroughly grind the dried glucanure mixture with the dry salt. If this method is used, the catalyst should be ground in before the lubricant is added, for after such a substance as zinc stearate is added, grinding is practically impossible.

Having a molding compound containing reactive urea-formaldehyde resin (combined if desired as a glucanure compound with the filler), a latent curing catalyst as provided in this invention, and a lubricant, the composition may be subjected to hot pressing usually effected at a temperature of about 125 to 150° C. under a pressure of from about 2000 to 3500 pounds per square inch, to mold any desired article. The salts of the halogenated acids liberate an acid substance under molding conditions, and effectively harden the resin. It should be noted that the catalysts claimed do not liberate dangerous hydro-halogen acids, but merely the comparatively innocuous carboxylic acid which is sufficient, however, to bring about a cure. This is important because repeated use of molding compositions containing curing catalysts which depend on the liberation of, say, hydrogen chloride or bromide, as the active principle tends to cause pitting, staining and corrosion of molds, thus deteriorating an expensive piece of apparatus. Furthermore, these catalyzing salts are comparatively cheap, easy to prepare, substantially stable at ordinary temperatures, are light colored themselves and yield light-colored products, have relatively low molecular weights, and are hence efficient and economical.

In presenting the following examples illustrative of the invention, I do not wish to be limited by their procedures or proportions, as modifications within the scope of the invention will present themselves to one skilled in the art.

*Example 1.*—1120 parts by weight of a 37% formaldehyde solution and 552 parts by weight urea were boiled under reflux at pH 7 for 1½ hours. Of the resulting syrup, 200 parts were mixed with 62 parts of alpha flock and the composition was dried at 64° C. in a current of air, and ground. This material was hot-pressed at 140° C., for 5 minutes, without adding any activator. It would not cure, the moldings being soft and sticky, of waxy heterogeneous appearance, and possessing low mechanical strength.

100 parts of the powder and 1 part of the sodium salt of monochloracetic acid were ground together in a ball mill and subsequently further ground with 0.35 part of zinc stearate.

The activated composition was molded at 140° C., 3500 pounds per square inch, for 5 minutes. The material was soft flowing, the moldings being well formed and glazed, white strong, and translucent. An object was immersed in boiling water for 15 minutes and it was substantially unaffected, the glaze remaining excellent.

A portion of the composition was stored in a closed container for 7½ months, and then molded as before. Again the flow was soft and molded objects were obtained which were well cured. The powder did not deteriorate in storage.

*Example 2.*—A blank molding composition was prepared as described in the first paragraph of Example 1. This was activated with 1 per cent sodium dichloracetate by grinding the components together in a ball mill. Zinc stearate was also added to the extent of 0.25 per cent.

The finished composition was molded at 140° C., 3500 pounds per square inch, for 5 minutes. The molded objects were well formed and glazed, light colored and translucent.

*Example 3.*—150 parts of 37% formaldehyde solution and 75 parts of urea were boiled together under reflux at pH 7 for 1 hour. 1.5 parts of neutral sodium monochloracetate were added to the syrup and the whole mixed with 60 parts of alpha flock. The mixture was dried in a current of air at 60° C. and subsequently ground to a powder.

The product was molded at 140° C., 3500 pounds per square inch, for 5 minutes. The moldings obtained were well cured, possessed a high glaze, were light colored and translucent.

*Example 4.*—A blank molding composition was prepared as follows: 1000 parts of neutral 37% aqueous formaldehyde and 500 parts of urea were boiled under reflux for 1 hour. The resulting syrup was mixed with 400 parts of alpha flock, dried at 64° C. and ground.

The powder was activated with 1 per cent zinc monochloracetate by grinding the powder and dry salt in a ball mill; 0.25 per cent zinc stearate was also ground in. The product was molded at 140° C., 3500 pounds per square inch, for 5 minutes.

The molded objects were quite translucent, light colored, well formed and glazed. The flow of the composition was soft. A molding, immersed in boiling water for 15 minutes, absorbed 4.5 per cent moisture, which is average for a urea-formaldehye molding composition.

*Example 5.*—Using a blank molding composition prepared as described in the first paragraph of Example 4, it was activated by grinding in a ball mill with 1 per cent of ammonium monochloracetate. The moldings made at 140° C., 3500 pounds per square inch, for 5 minutes, were substantially of the same appearance as those of Example 4, the composition curing satisfactorily.

*Example 6.*—Example 5 was repeated using 1 per cent of calium monochloracetate. Excellent, well cured, translucent, light-colored objects were formed on molding. After being immersed in boiling water for 15 minutes, the moldings absorbed an average of 2.1 per cent water.

*Example 7.*—Example 5 was repeated using 1 per cent sodium α-chloropropionate. The flow of the finished composition was soft. The molded articles were well formed, cured, and glazed, light colored, and translucent. When immersed in boiling water for 15 minutes the molded pieces absorbed 3 per cent water.

*Example 8.*—Example 5 was repeated using 1 per cent ammonium α-chloropropionate as the activator. The appearance of the molded products was the same as of those produced according to Example 7.

*Example 9.*—Sodium iodoacetate was tested following the procedure of Example 5. The moldings were light colored, very translucent, well formed and glazed, strong and apparently well cured. The flow of the composition was soft.

*Example 10.*—Example 9 was repeated, using sodium bromo-acetate. The moldings obtained were well cured, and resembled those of Example 9 in appearance. When immersed in boiling water for 15 minutes, the glaze was scarcely affected and the water absorption was 7.4 per cent.

What I claim is:

1. A urea-formaldehyde molding composition containing a latent catalyst comprising a salt of chloracetic acid.

2. A urea-formaldehyde molding composition containing a latent catalyst comprising a salt of chlorpropionic acid.

3. A urea-formaldehyde molding composition containing a latent catalyst comprising a salt of a halogenated aliphatic carboxylic acid selected from the class consisting of the mono- and dihalogenated straight chain mono-carboxylic acids which remains substantially neutral before being broken down by heat and pressure during molding and which, upon being broken down, liberates an acid not corrosive to the metal structure of molds.

4. In the process of making a urea-formaldehyde molding composition, the step of adding a latent catalyst comprising a salt of chloracetic acid, to a mixture comprising cellulose and urea-formaldehyde resin.

5. In the process of making a urea-formaldehyde molding composition, the step of adding a latent catalyst comprising a salt of chlorpropionic acid to a mixture comprising cellulose and urea-formaldehyde resin.

6. In the process of making a urea-formaldehyde molding composition, the step of adding to a mixture comprising cellulose and urea-formaldehyde resin, a latent catalyst comprising a salt of a halogenated aliphatic carboxylic acid selected from the class consisting of the mono- and di-halogenated straight chain mono-carboxylic acids which remains substantially neutral before being broken down by heat and pressure during molding and which, upon being broken down, liberates an acid not corrosive to the metal structure of molds.

7. A molding composition comprising a glucanure and a small proportion of a salt of chloracetic acid.

8. A molding composition comprising a glucanure and a small proportion of a salt of a chlorinated straight chain mono-carboxylic acid selected from the class consisting of the mono- and di-halogenated straight chain mono-carboxylic acids which remains substantially neutral before being broken down by heat and pressure during molding and which is reactive at molding temperature to release a curing proportion of an acid not corrosive to the metal structure of molds.

9. A molding composition comprising a glucanure and a small proportion of a salt of a halogenated aliphatic carboxylic acid selected from the class consisting of the mono- and di-halogenated straight chain mono-carboxylic acids which remains substantially neutral before being broken down by heat and pressure during molding and which is reactive at molding temperature to release a curing proportion of an acid not corrosive to the metal structure of molds.

CARLETON ELLIS.

DISCLAIMER 2,133,689.—*Carleton Ellis*, Montclair, N. J. UREA ALDEHYDE MOLDING COMPOSITIONS CONTAINING A LATENT CURING CATALYST. Patent dated October 18, 1938. Disclaimer filed July 22, 1941, by the assignee, *Plaskon Company, Incorporated*.

Hereby disclaims claims 1 and 7 of said patent; and further disclaims from claim 3 all urea-formaldehyde molding compositions containing a latent catalyst in which said latent catalyst is a salt of chloracetic acid; and further disclaims from claim 8 all molding compositions comprising a glucanure and a small proportion of a salt of a chlorinated straight chain monocarboxylic acid in which said salt is a salt of chloracetic acid; and further disclaims from claim 9 all molding compositions comprising a glucanure and a small proportion of a salt of a halogenated aliphatic carboxylic acid in which said salt is a salt of chloracetic acid.

[*Official Gazette August 12, 1941.*]

acid not corrosive to the metal structure of molds.

4. In the process of making a urea-formaldehyde molding composition, the step of adding a latent catalyst comprising a salt of chloracetic acid, to a mixture comprising cellulose and urea-formaldehyde resin.

5. In the process of making a urea-formaldehyde molding composition, the step of adding a latent catalyst comprising a salt of chlorpropionic acid to a mixture comprising cellulose and urea-formaldehyde resin.

6. In the process of making a urea-formaldehyde molding composition, the step of adding to a mixture comprising cellulose and urea-formaldehyde resin, a latent catalyst comprising a salt of a halogenated aliphatic carboxylic acid selected from the class consisting of the mono- and di-halogenated straight chain mono-carboxylic acids which remains substantially neutral before being broken down by heat and pressure during molding and which, upon being broken down, liberates an acid not corrosive to the metal structure of molds.

7. A molding composition comprising a glucanure and a small proportion of a salt of chloracetic acid.

8. A molding composition comprising a glucanure and a small proportion of a salt of a chlorinated straight chain mono-carboxylic acid selected from the class consisting of the mono- and di-halogenated straight chain mono-carboxylic acids which remains substantially neutral before being broken down by heat and pressure during molding and which is reactive at molding temperature to release a curing proportion of an acid not corrosive to the metal structure of molds.

9. A molding composition comprising a glucanure and a small proportion of a salt of a halogenated aliphatic carboxylic acid selected from the class consisting of the mono- and di-halogenated straight chain mono-carboxylic acids which remains substantially neutral before being broken down by heat and pressure during molding and which is reactive at molding temperature to release a curing proportion of an acid not corrosive to the metal structure of molds.

CARLETON ELLIS.

DISCLAIMER 2,133,689.—*Carleton Ellis*, Montclair, N. J. UREA ALDEHYDE MOLDING COMPOSITIONS CONTAINING A LATENT CURING CATALYST. Patent dated October 18, 1938. Disclaimer filed July 22, 1941, by the assignee, *Plaskon Company, Incorporated*.

Hereby disclaims claims 1 and 7 of said patent; and further disclaims from claim 3 all urea-formaldehyde molding compositions containing a latent catalyst in which said latent catalyst is a salt of chloracetic acid; and further disclaims from claim 8 all molding compositions comprising a glucanure and a small proportion of a salt of a chlorinated straight chain monocarboxylic acid in which said salt is a salt of chloracetic acid; and further disclaims from claim 9 all molding compositions comprising a glucanure and a small proportion of a salt of a halogenated aliphatic carboxylic acid in which said salt is a salt of chloracetic acid.

[*Official Gazette August 12, 1941.*]